(12) United States Patent
Maier et al.

(10) Patent No.: US 11,426,026 B2
(45) Date of Patent: Aug. 30, 2022

(54) PORTABLE FOOD WARMER AND COOKER

(71) Applicants: Benjamin Maier, Florence, MT (US); Jessie Lyons, Florence, MT (US)

(72) Inventors: Benjamin Maier, Florence, MT (US); Jessie Lyons, Florence, MT (US)

( * ) Notice: Subject to any disclaimer, the term of this patent is extended or adjusted under 35 U.S.C. 154(b) by 240 days.

(21) Appl. No.: 16/534,623

(22) Filed: Aug. 7, 2019

(65) Prior Publication Data

US 2020/0046165 A1 Feb. 13, 2020

Related U.S. Application Data

(60) Provisional application No. 62/715,441, filed on Aug. 7, 2018.

(51) Int. Cl.
*A47J 27/00* (2006.01)
*A47J 36/24* (2006.01)
*B60N 3/16* (2006.01)
*A47J 36/26* (2006.01)

(52) U.S. Cl.
CPC ............ *A47J 36/26* (2013.01); *A47J 27/002* (2013.01); *A47J 36/24* (2013.01); *B60N 3/16* (2013.01); *A47J 2202/00* (2013.01)

(58) Field of Classification Search
CPC ....................................................... B60N 3/16
See application file for complete search history.

(56) References Cited

U.S. PATENT DOCUMENTS

| | | | | | |
|---|---|---|---|---|---|
| 1,559,909 | A | * | 11/1925 | Paul | B60N 3/16 126/19.5 |
| 3,013,548 | A | * | 12/1961 | Thomas | A47J 39/00 126/19.5 |
| 3,521,030 | A | * | 7/1970 | Maahs | B60N 3/16 219/202 |
| 3,590,802 | A | | 7/1971 | Fried | |
| 3,669,003 | A | * | 6/1972 | King | F24C 7/00 99/331 |
| 3,746,205 | A | * | 7/1973 | Helguera | A47J 27/04 220/573.4 |
| 3,809,059 | A | * | 5/1974 | Burk | B60N 3/16 126/19.5 |
| 3,874,361 | A | * | 4/1975 | Parrinello | B60N 3/16 126/19.5 |
| 4,162,670 | A | | 7/1979 | Hays | |
| 4,518,189 | A | * | 5/1985 | Belt | B60N 3/16 126/24 |

(Continued)

FOREIGN PATENT DOCUMENTS

| | | | | | |
|---|---|---|---|---|---|
| FI | 64944 | B | * | 10/1983 | ............ F24C 15/103 |
| KR | 2000-0036340 | A | * | 7/2000 | ............ B60N 3/104 |

*Primary Examiner* — John J Norton
(74) *Attorney, Agent, or Firm* — Boudwin Intellectual Property; Daniel Boudwin

(57) ABSTRACT

A portable food warmer and cooker. The portable food warmer and cooker includes a base and a plurality of sidewalls extending upwardly. A lid is removably secured with a plurality of latches to a top portion of the sidewalls. At least one heater hose is connected to the food warmer and cooker. The heater hose enters the portable food warmer and cooker through a sidewall and exits again through a sidewall. The heater hose is connected at a first end to a vehicle coolant line. The heater hose is connected at a second end to a heat exchanger located within the food warmer and cooker.

11 Claims, 3 Drawing Sheets

(56) References Cited

U.S. PATENT DOCUMENTS

| | | | | |
|---|---|---|---|---|
| 5,233,914 | A | * | 8/1993 | English ................ A47J 31/005 99/282 |
| 5,582,095 | A | | 12/1996 | Rial |
| 5,732,764 | A | | 3/1998 | Douglas et al. |
| 7,571,675 | B1 | * | 8/2009 | Cappadona ........... A47J 45/068 220/203.06 |
| 2004/0060930 | A1 | * | 4/2004 | Han ........................ H05B 6/80 219/679 |
| 2006/0236994 | A1 | | 10/2006 | Moisidis et al. |
| 2019/0053661 | A1 | * | 2/2019 | Van Der Merwe ... A47J 37/041 |

\* cited by examiner

PORTABLE FOOD WARMER AND COOKER

CROSS REFERENCE TO RELATED APPLICATIONS

This application claims the benefit of U.S. Provisional Application No. 62/715,441 filed on Aug. 7, 2018. The above identified patent application is herein incorporated by reference in its entirety to provide continuity of disclosure.

BACKGROUND OF THE INVENTION

The present invention relates to a food warming and cooking device. More particularly, the present invention provides a food warming and cooking device to be attached to an all-terrain vehicle or other machines with a coolant system, this may include boats, cars, trucks, tractors and any other machine with a coolant system.

The use of ATV's or UTV's to get people into remote places is becoming increasingly common. These trips can take a few hours or longer to get where a rider intends to go. On these trips the amenities of home like a stove top are nowhere to be found. This means that a person will have to stop their journey and light a fire or set up a stove to enjoy a hot meal. Fires can be restricted during the dry months of the year, and stoves can be expensive. This means that on such treks a person may be limited to cold foods for the journey.

Consequently, there is a need in for an improvement in the art of vehicle food warming and cooking. The present invention substantially diverges in design elements from the known art while at the same time solves a problem many people face when heating or cooking food far from home. In this regard, the present invention substantially fulfills these needs.

SUMMARY OF THE INVENTION

The present invention provides a food warming and cooking device wherein the same can be utilized for providing convenience for the when heating or cooking food far from home. The present system comprises a base and a plurality of sidewalls extending upwardly. A lid is attached with a plurality of latches to a top portion of the sidewalls. At least one heater hose is connected to the food warmer and cooker. The heater hose enters the portable food warmer and cooker through a sidewall and exits again through the sidewall. The heater hose is connected at a first end to a vehicle coolant line. The heater hose is connected at a second end to a heat exchanger located within the food warmer and cooker.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
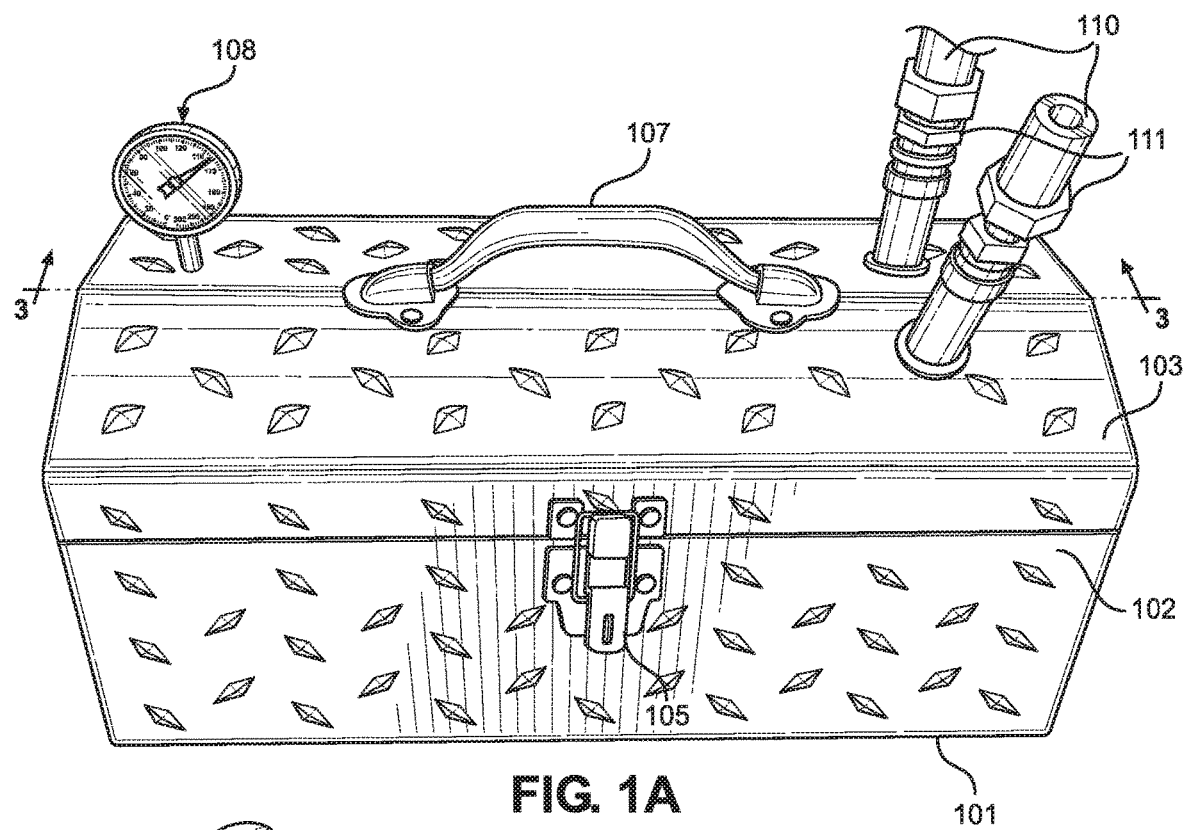
FIG. 1A shows a front perspective view of an embodiment of the outside of the portable food warmer and cooker.

Reference is made herein to the attached drawings. Like reference numerals are used throughout the drawings to depict like or similar elements of the portable food warmer and cooker. For the purposes of presenting a brief and clear description of the present invention, a preferred embodiment will be discussed as used when heating up or cooking food in remote locations using a vehicle and the portable food warmer and cooker. The figures are intended for representative purposes only and should not be considered to be limiting in any respect.

Figure 1B:
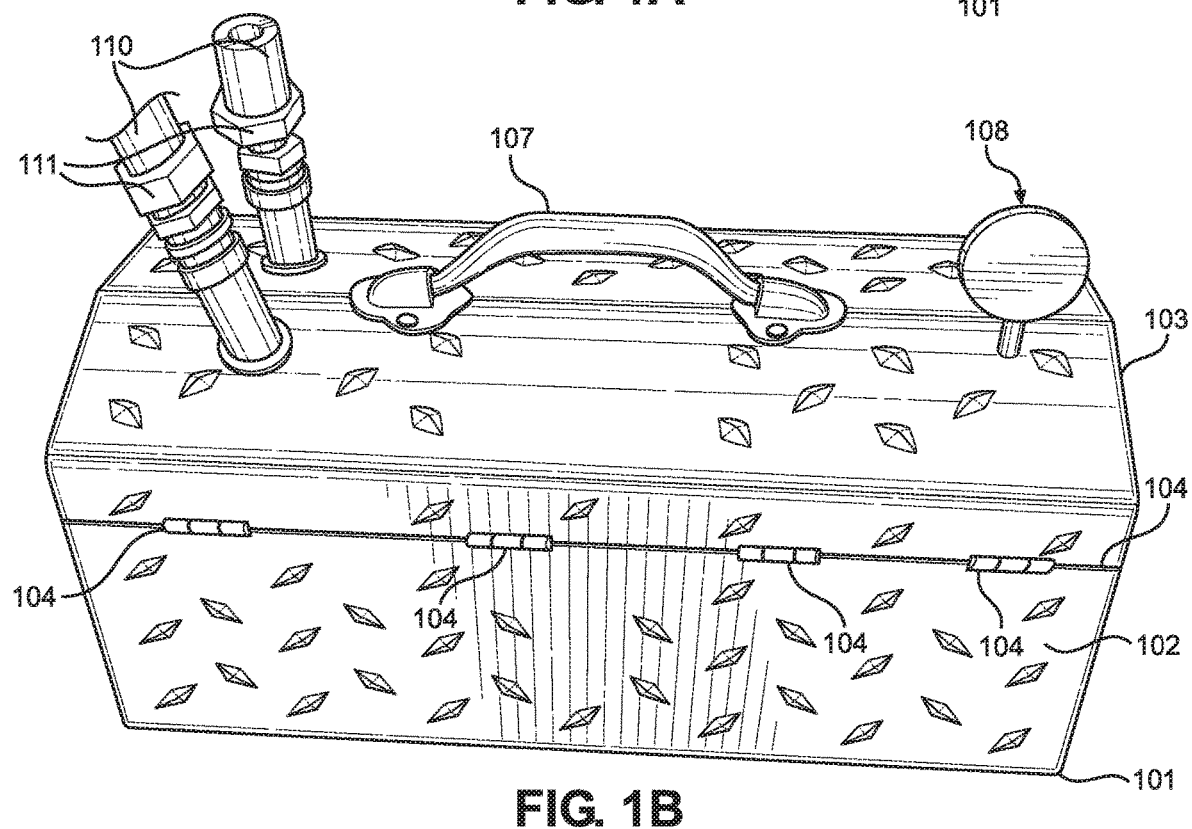
FIG. 1B shows a rear perspective view of an embodiment of the outside of the portable food warmer and cooker.

Referring now to FIG. 1A and FIG. 1B, there is shown a perspective view of an embodiment of the outside of the portable food warmer and cooker. The portable food warmer and cooker has a housing that is comprised of a base 101 and a plurality of sidewalk 102. The sidewalls 102 extend upwardly from the base and define an interior volume of the housing. In one embodiment, the base 101 and the sidewalls 102 are made of a heat resistant material. In one embodiment, the housing is a rectangle shape. In another embodiment, the housing is of another suitable shape.

A lid 103 is attached to at least one of the sidewalk 102. In one embodiment, the lid 103 is attached with hinges 104 on one side. There is a clasp 105 on a side opposite of the hinges 104. In another embodiment, the lid 103 may be held on entirely with clasps 105. In an embodiment, the lid 103 has a handle 107 disposed on a top surface. In one embodiment, the handle 107 is in a fixed position. In one embodiment, the handle 107 is movable into a flush position against the lid 103, such that the amount of space taken up by the portable food warmer and cooker is reduced.

The lid 103 further has a temperature gauge 108 disposed on the top surface. In one embodiment, the temperature gauge 108 is a thermometer. In another embodiment, where the temperature gauge 108 is a thermometer, the thermometer is digital. In another embodiment, where the temperature gauge 108 is a thermometer, the thermometer is analog.

There is a heating hose 110 that enters and exits the housing. In one embodiment, there are connections 111 where the heating hose 110 is connected to the housing through an inlet connection. The heating hose 110 is then connected to an exit connection. This will ensure that the loop is completed, and the coolant returns to the engine. In one embodiment, the connection 111 is a quick connect fitting. In another embodiment, the connection 111 is a screw on connection. In yet another embodiment, the connection 111 is a hose clamp.

The heater hoses 110 are connected to the coolant system of the vehicle. In one embodiment, the connection 111 is a T-valve connection. When the heater hoses 110 are connected to the coolant system via a T-valve connection the connection will allow the coolant to flow through the engine properly and the portable warming and cooking device. In this embodiment, a user can select the flow rate of coolant to the portable food warmer and cooker.

In one embodiment, the hoses enter from the top of the housing. In this embodiment, the lid 103 is in two parts and is configured to have a permanently attached section and a removable section. In one embodiment, the permanently attached section is welded to the sidewalls. The permanently attached section has the connections 111 placed therethrough such that they are in fluid communication with the interior of the housing.

Figure 2:
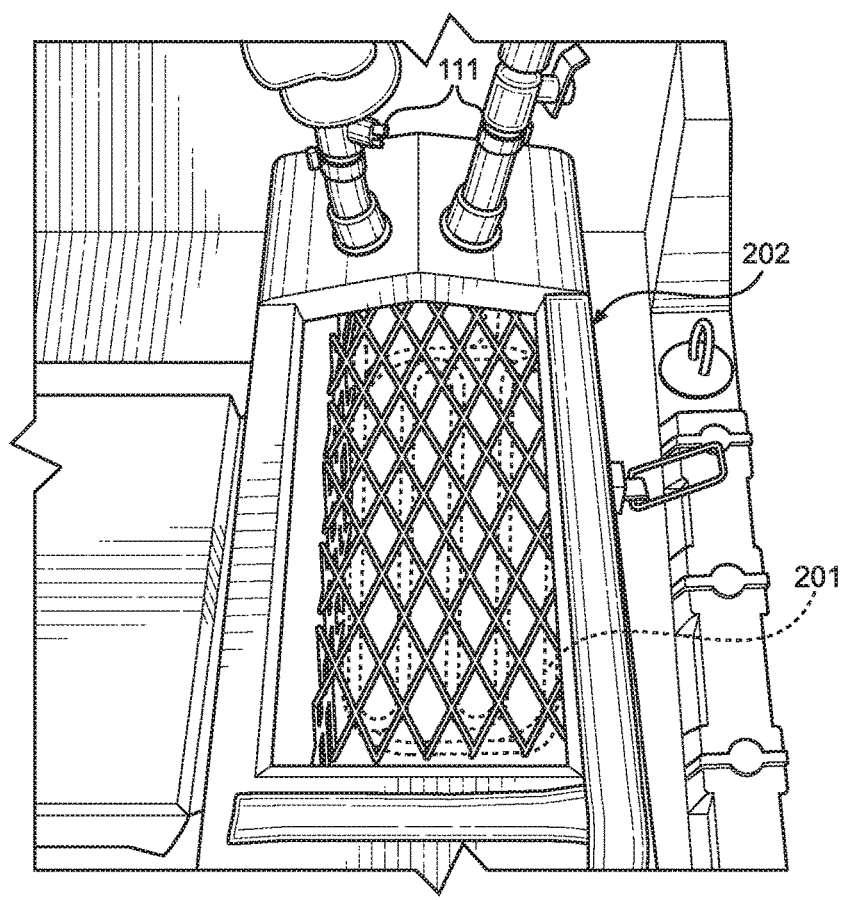
FIG. 2 shows a perspective view of an embodiment of the inside of the portable food warmer and cooker.

Referring now to FIG. 2, there is shown a perspective view of an embodiment of the inside of the portable food warmer and cooker. There is a heat exchanger 201 fluidly connected to the connections 111. In one embodiment, the heat exchanger 201 is a piping. The piping is a conductive material to allow the heat to pass from the coolant to the pipes and into the housing. In one embodiment, there is a grate 202 placed within the interior. The grate 202 is placed above the heat exchanger and allows food to be placed thereon. In one embodiment, the grate 202 is permanently attached to the interior of the food warmer and cooker.

Figure 3:
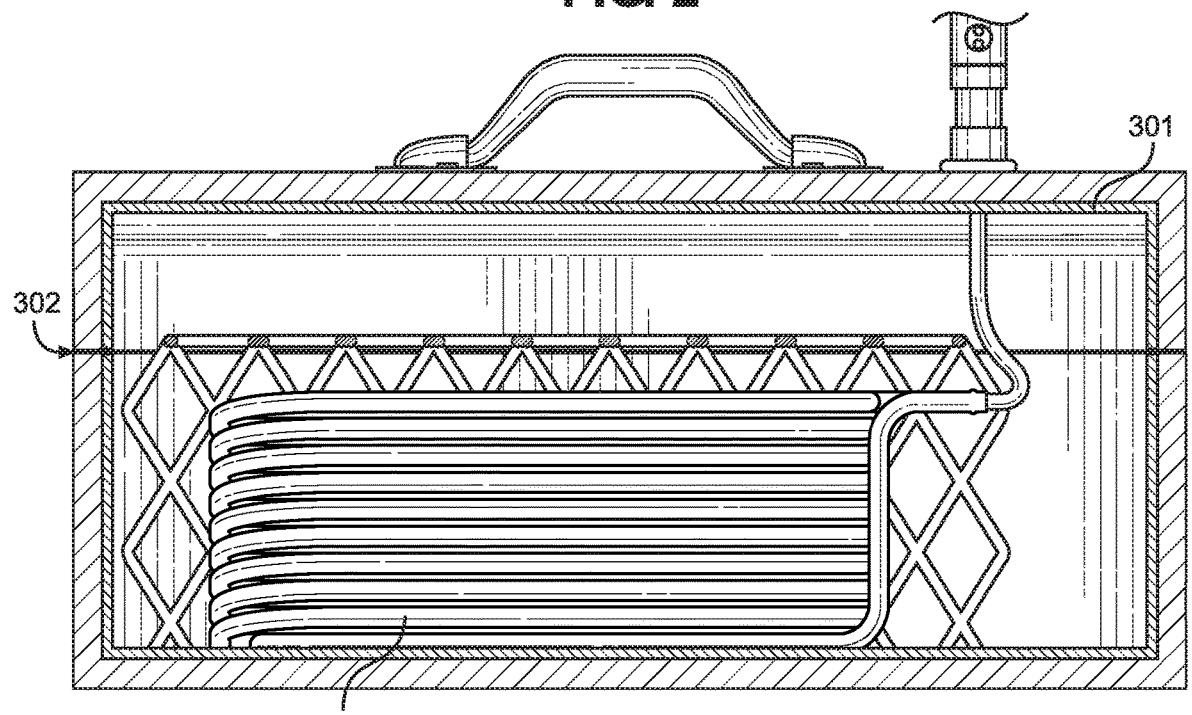
FIG. 3 shows a cross-sectional view of an embodiment of the portable food warmer and cooker.

Referring now to FIG. 3, there is shown a cross-sectional view of an embodiment of the portable food warmer and cooker. In one embodiment, the portable food warmer and cooker has an insulative layer 301. The insulative layer 301 lines the walls of the housing. The insulative layers 301 are designed to keep the heat within the housing. Further, in one embodiment there is a sealing material 302 disposed around the perimeter of the housing. The sealing material 302 seals the lid 103 when in a shut configuration.

From the side view, the heat exchanger 201 can be seen. The heat exchanger 201 is a tube that forms a coil. The heat exchanger 201 is shown to take up the bottom portion of the food warmer and cooker. In other embodiments, the heat exchanger 201 can be placed in many different configurations. In one embodiment, the heat exchanger 201 is configured to line the walls of the food warmer and cooker. In this embodiment a dish can be placed within the food warmer and cooker as shown and described in FIG. 5.

Figure 4:
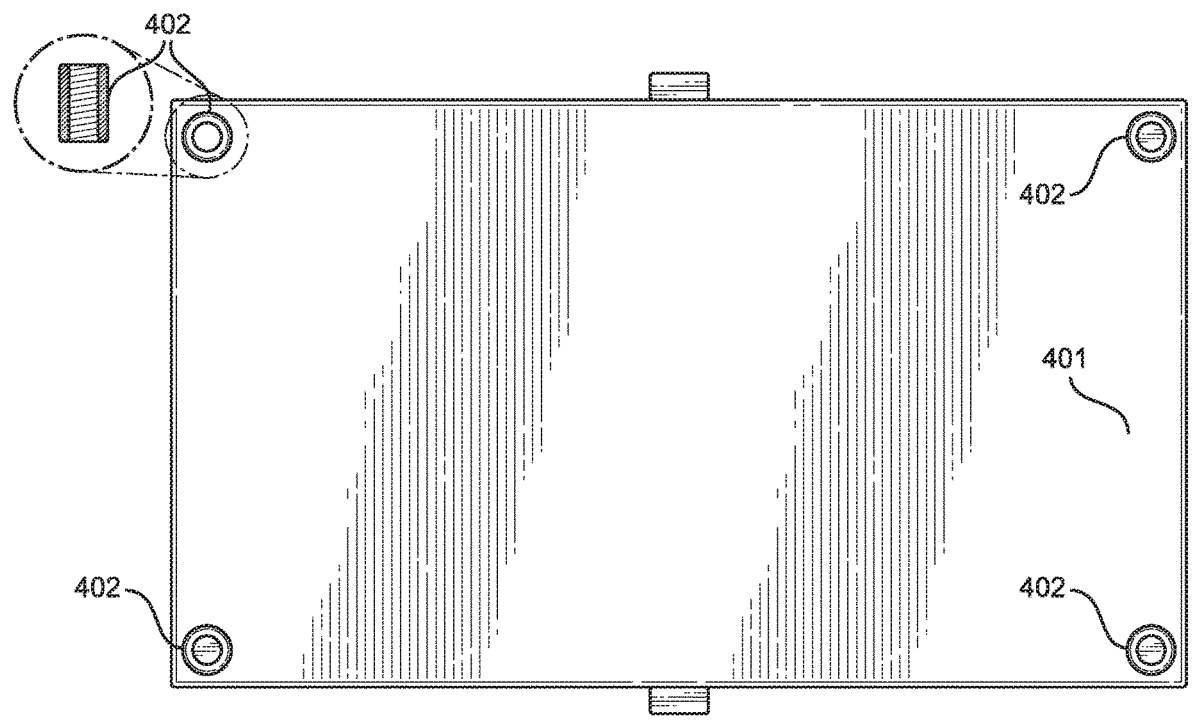
FIG. 4 shows a bottom up view of an embodiment of the portable food warmer and cooker with rivnuts placed therein.

Referring now to FIG. 4, there is shown a bottom up view of an embodiment of the portable food warmer and cooker with rivnuts placed therein. The portable food warmer and cooker is designed to be attached to a vehicle in all manner of ways. The bottom 401 of the food warmer and cooker has a plurality of rivnuts 402 located therein. The rivnut 402 is an insert that will connect to the bottom 401. The rivnut 402 has an opening with screw threads therein. While the shown embodiment has a rivnut 402 placed in each corner of the bottom 401 food warmer and cooker many different placements of rivnuts 402 will be suitable to produce the desired result. Using Rivnuts 402 many different attachment devices can be used. In one embodiment bolts can be used. In another embodiment hooks can be used by screwing them into the rivnuts 402.

Figure 5:
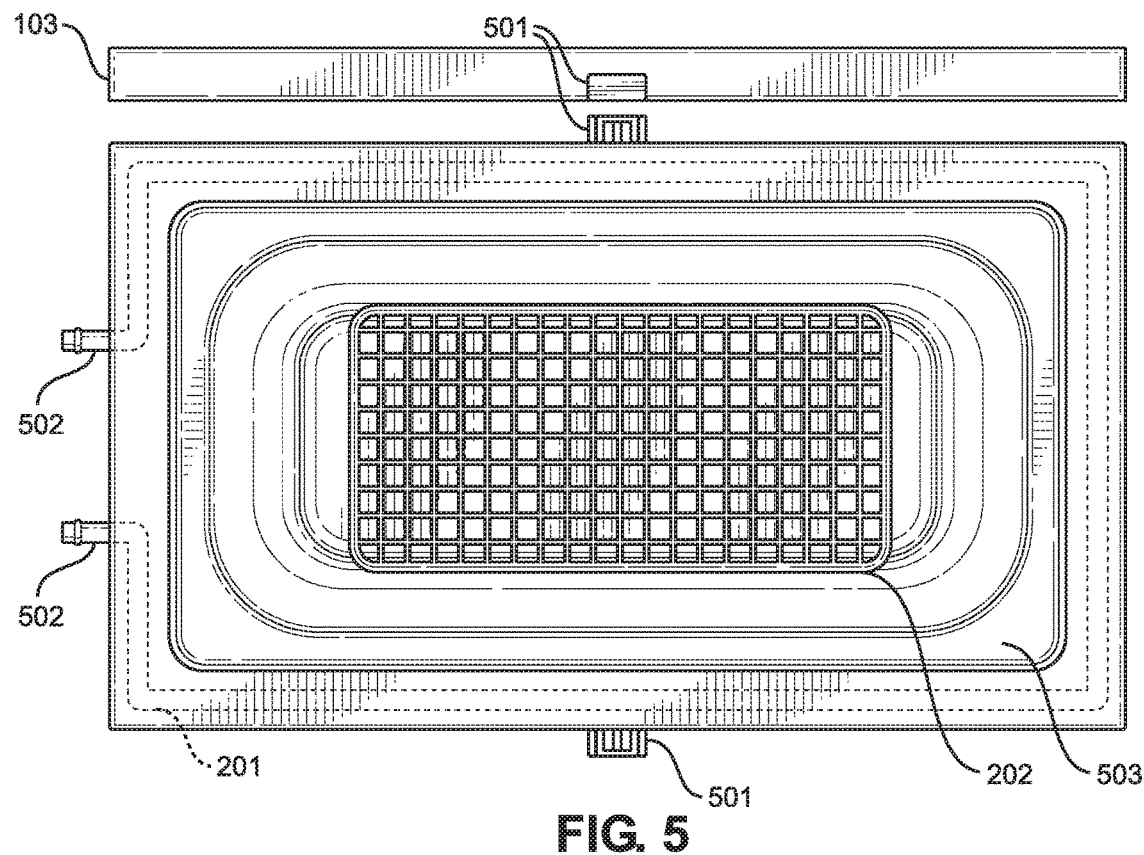
FIG. 5 shows a top down view of an embodiment of the portable food warmer and cooker.

Referring now to FIG. 5, there is shown a top down view of an embodiment of the portable food warmer and cooker. In one embodiment the lid 103 is attached to the portable food warmer and cooker via a plurality of clamps 501. At least 2 clamps 501 can be used to eliminate the need for hinges. In this embodiment a first part of a clamp 501 is positioned at the top of at least two sidewalls. The first part of clamp 501 connects to a second part of the clamp 501 located on the lid 103. The clamps 501 will hold the lid 103 in place even over the rough terrain that is expected in all-terrain vehicles.

In embodiments where the lid 103 is connected with clamps 501 the heater hoses may also be configured differently. In one embodiment, the heater hoses enter the portable food warmer and cooker from a sidewall. In one of these embodiments there is a heater hose connection 502 placed through the sidewall. This heater hose connection 502 will connect to the heat exchanger 201 on the interior of the device.

In one embodiment, the heat exchanger 201 is placed within the device such that it encircles a warming or cooking dish 503. In one embodiment, the dish 503 is NSF approved. In an embodiment, the dish 503 is removably placed within the device. In another embodiment, the dish 503 is secured to the portable food warmer and cooker. This embodiment will add stability to the dish 503 when in motion. In an embodiment, where the dish 503 is secured to the device it is glued in place. In another embodiment, the dish is welded in place. The dish 503 can be configured to accept inserts. In one embodiment a grate 202 can be inserted therein.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A portable food warmer and cooker, comprising:
a base having a plurality of sidewalls extending upwardly therefrom;
a lid removably secured to a top portion of the plurality of sidewalls, wherein the lid is movable between an open configuration and a closed configuration;
a heater hose connected to the food warmer and cooker, wherein the heater hose connects to a top portion of the food warmer and cooker;
the heater hose is connected at a first end and a second end to a vehicle coolant line;
the heater hose is connected at a middle section to a heat exchanger located within the food warmer and cooker;
wherein the heat exchanger includes a coiled structure positioned within an interior volume defined by the base and the plurality of sidewalls;
a food grate positioned within the interior volume above the heat exchanger and extending downwardly toward the base adjacent one side of the heat exchanger.

2. The portable food warmer and cooker of claim 1, further comprising a lock device on the lid such that the lid can be locked in the closed position.

3. The portable food warmer and cooker of claim 1, wherein a handle is located on the lid.

4. The portable food warmer and cooker of claim 1, further comprising a temperature gauge located on the lid of the food warmer and cooker.

5. The portable food warmer and cooker of claim 1, wherein there are two heater hoses.

6. The portable food warmer and cooker of claim 1, further comprising a quick connect fitting to connect the heater hose to the coolant system.

7. The portable food warmer and cooker of claim 1, further comprising a plurality of rivnuts located on a bottom side of the food warmer and cooker, wherein the rivnuts are configured to attach the food warmer and cooker to a vehicle.

8. The portable food warmer and cooker of claim 1, further comprising an insulating layer located on the interior of the portable food warmer and cooker.

9. The portable food warmer and cooker of claim 1, wherein the lid is secured using a plurality of clamps.

10. The portable food warmer and cooker of claim 1, further comprising a plurality of hose clamps to connect the heater hose to the vehicle coolant line and the portable food warmer and cooker.

11. The portable food warmer and cooker of claim 1, further comprising a food dish placed therein.

\* \* \* \* \*